E. G. W. PARKS.
VEGETABLE-WASHER.

No. 184,894. Patented Nov. 28, 1876.

UNITED STATES PATENT OFFICE.

ELISHA G. W. PARKS, OF ROCK FALLS, ILLINOIS.

IMPROVEMENT IN VEGETABLE-WASHERS.

Specification forming part of Letters Patent No. 184,894, dated November 28, 1876; application filed October 10, 1876.

*To all whom it may concern:*

Be it known that I, ELISHA G. W. PARKS, of Rock Falls, in the county of Whitesides and State of Illinois, have invented certain new and useful Improvements in Vegetable-Washers; and I do hereby declare that the following is a full and exact description thereof, reference being had to the accompanying drawings, making a part of this specification.

My invention relates to novel improvements in potato or vegetable washers. It has for its object to give a whirling and rotary motion to the potatoes or vegetables, to effect the perfect cleaning, and also to prevent any jamming or clogging of the same.

With these objects in view, my invention consists of a bucket or tub provided with a central shaft having arranged at its lower extremity intersecting arms flat on their bottoms, and increasing in size in curved lines from the shaft toward their extremity, as will be hereinafter more fully set forth.

To enable those skilled to more fully understand my invention, I will proceed to describe its construction and operation, referring, by letters, to the accompanying drawings, in which—

Figure 1:
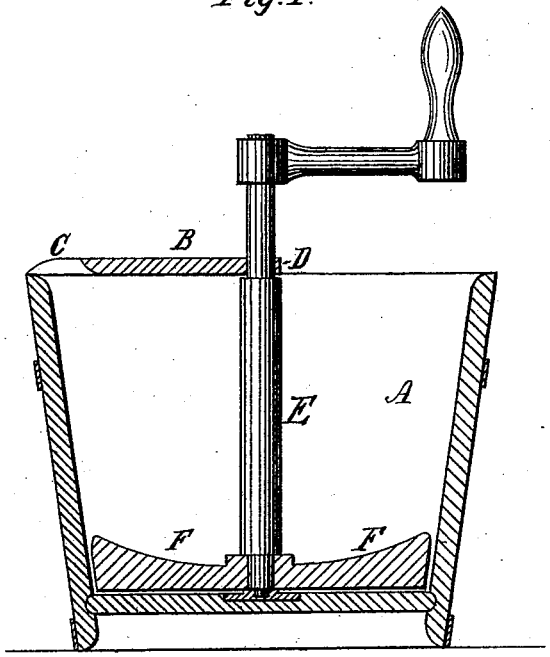
Figure 2:
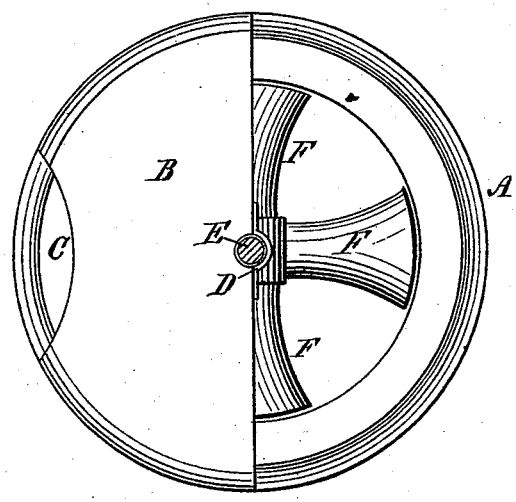

Figure 1 is a central vertical section of a potato-washer embodying the features of my invention, and Fig. 2 a top view of the same with the handle removed.

Similar letters indicate like parts in both figures.

A represents an ordinary bucket or tub of suitable or convenient size, with a permanent half-cover, B, cut away at C, to form an escape for the water when it is desired to pour the same off, the cover B serving as a guard to prevent the escape of the potatoes. D is a half-bearing secured to the cover B, and through which the shaft E passes, and has its lower extremity resting in a step or other suitable bearing centrally located in the bottom of the bucket A. Secured around the shaft E at its lower extremity are arms F, the under sides of which are flat and lie close to the bottom of the bucket. These arms F, as will be clearly seen by reference to the drawing, increase in size in curved lines upward and outward from the point of connection with the shaft E toward their outer extremity, so that potatoes or other vegetables to be washed, resting upon the same, are lifted by the rotation of the shaft E from off the bottom, and out toward the staves or outer circumference of the bucket, descending again to the center and toward the bottom, thus acquiring a rotary and whirling motion, and thus effectually cleaning the same when immersed in water. When the vegetables have been subjected to the action of the revolving radial arms for a suitable length of time, which I have found, by experience, is as short as a half minute for a peck of potatoes, the dirty water is poured off, leaving the clean potatoes in the bucket to be pared for use.

In a washer constructed as above described, the vegetables are not subjected to any pounding motion, and there is no liability of their being clogged or jammed, and the machine is equally efficient and effective, whether operated as a right or left hand machine.

What I claim as new, and desire to secure by Letters Patent, is—

In a vegetable-washer provided with a suitable cover, and having a central step-bearing in its bottom, and rotating shaft, the radial arms F, flat on their under side, and adapted to work close to the bottom of the washer, the exposed portions of said arms tapering in curved lines upward and outward, whereby the vegetables resting thereon are given a rotary and whirling motion, and the arms adapted to rotate in either direction, substantially as described.

In witness whereof I have hereunto set my hand and seal this 6th day of October, 1876.

ELISHA G. W. PARKS. [L. S.]

Witnesses:
GEORGE W. NANCE,
C. D. F. PARKS.